March 28, 1944.  C. M. EASON  2,345,244

CLUTCH OPERATING MECHANISM

Original Filed Sept. 4, 1940  3 Sheets—Sheet 1

Inventor:
Clarence M. Eason.
By Brown, Jackson, Boettcher + Dienner
Attys.

March 28, 1944.　　　C. M. EASON　　　2,345,244
CLUTCH OPERATING MECHANISM
Original Filed Sept. 4, 1940　　　3 Sheets-Sheet 2

Inventor:
Clarence M. Eason.
By Brown, Jackson, Boettcher & Dienner
Attys.

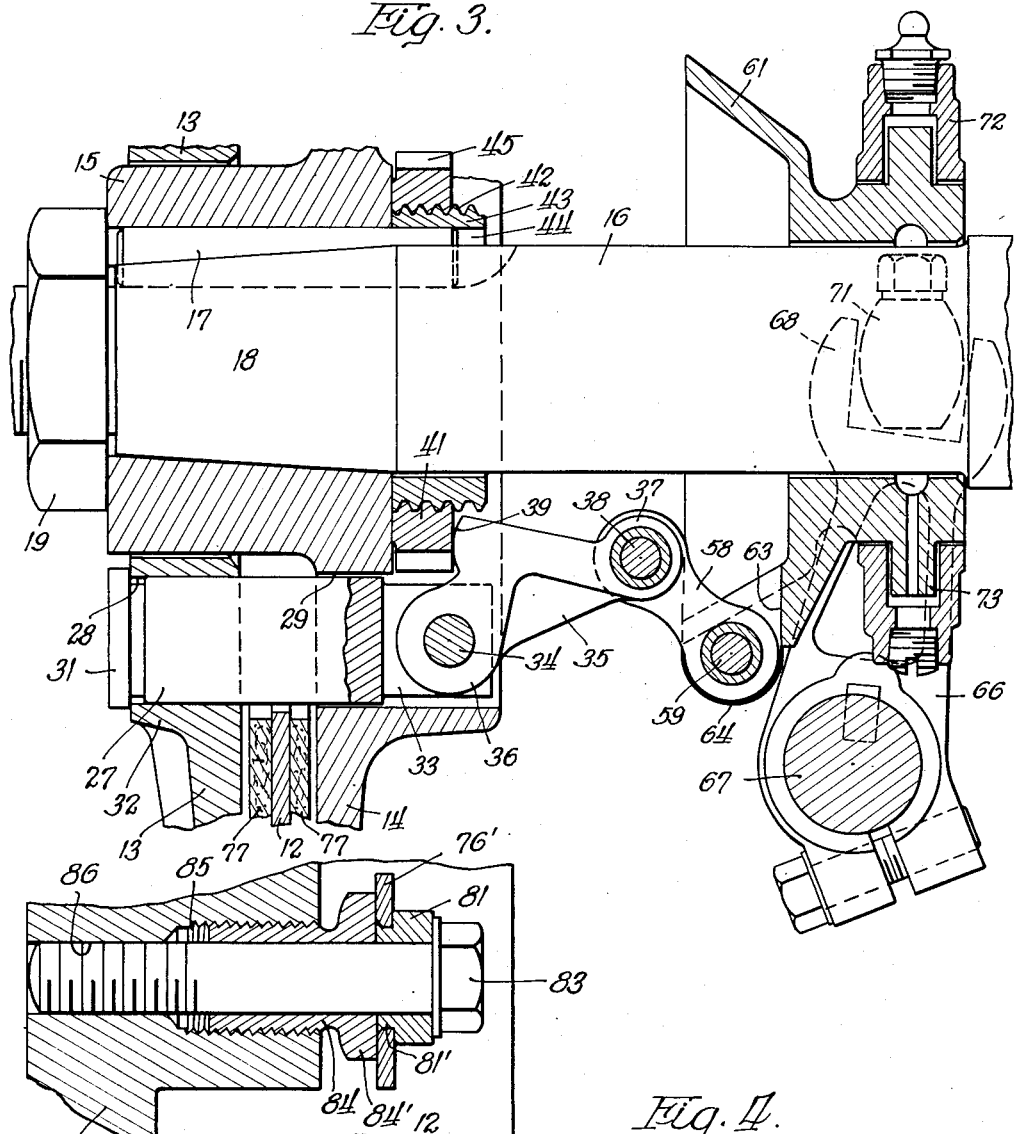

Patented Mar. 28, 1944

2,345,244

UNITED STATES PATENT OFFICE 2,345,244

CLUTCH OPERATING MECHANISM

Clarence M. Eason, Waukesha, Wis.

Original application September 4, 1940, Serial No. 355,331. Divided and this application August 7, 1941, Serial No. 405,745

6 Claims. (Cl. 192—68)

The present invention relates to operating mechanism for friction clutches used to control the transmission of power from a driving member to a driven member. This application is a division of my prior Patent No. 2,303,201, issued November 24, 1942, on "Clutches."

One of the features of the invention resides in an improved construction of toggle mechanism in the clutch operator.

Another feature of the invention resides in an improved toggle type of clutch operator wherein centrifugal force is utilized to assist in moving the clutch to one position, or to assist in holding the clutch in one position. When the shiftable clutch element and the clutch operator elements are part of the driving assembly, this centrifugal force action can be utilized to assist in holding the clutch in its released position.

Other features, objects and advantages of the invention will appear from the following detailed description of one preferred embodiment thereof.

In the accompanying drawings illustrating such embodiment:

Figure 3 is a detail sectional view showing the clutch operating mechanism in the clutch releasing position; and Figure 4 is a detail sectional view on a larger scale of one of the adjustable mounting sleeves and cap screws which secure the flexible arms of the clutch disc segments to the flywheel, this view being taken approximately on the plane of the line 4—4 of Figure 2.

Figure 1:
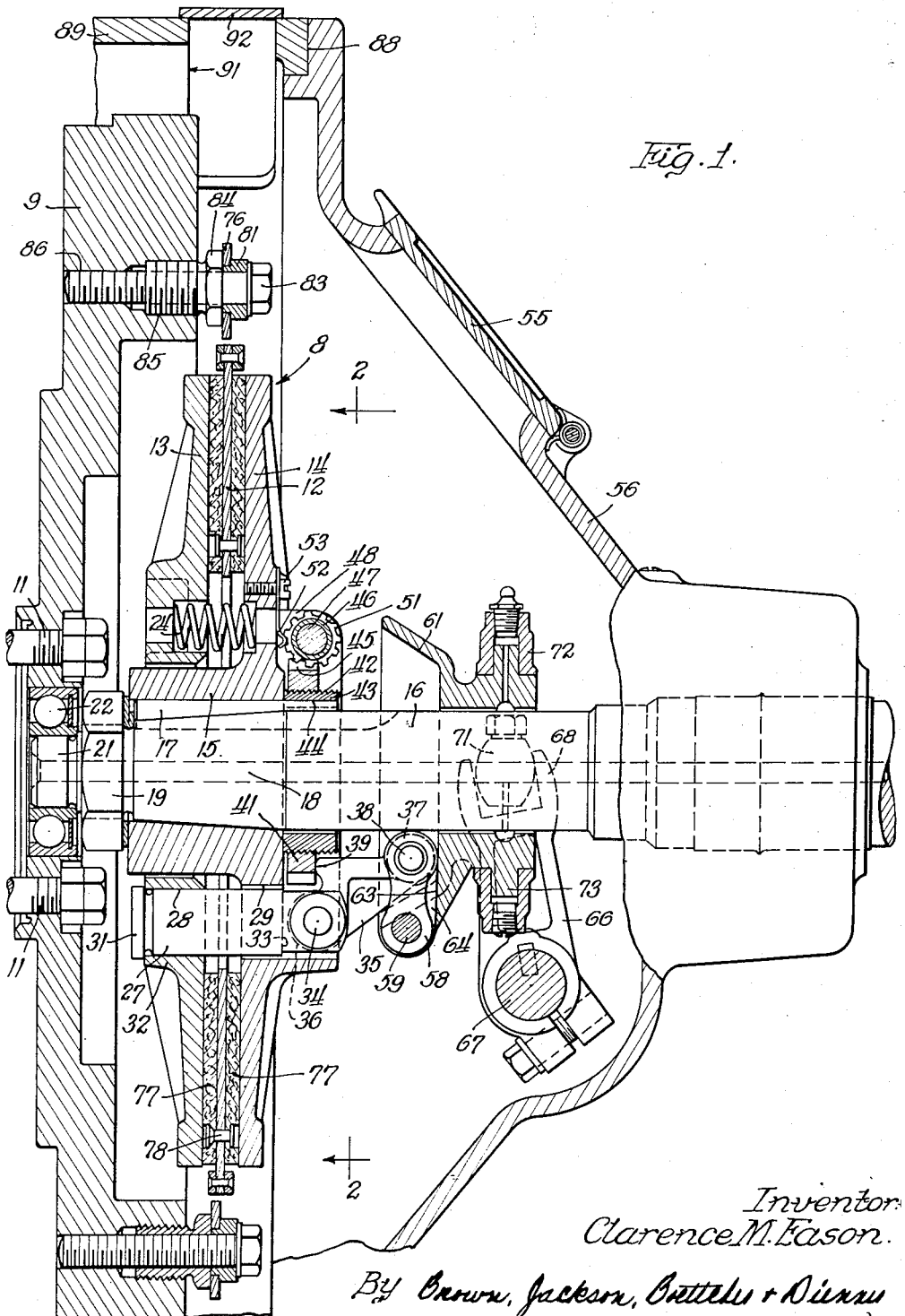
Figure 1 is an axial sectional view taken approximately on the plane of the line 1—1 of Figure 2, showing my improved clutch embodied in a power take-off unit.

Referring to Figure 1, the clutch 8 is adapted to be secured to a rotary member 9, which may be either a driving member or a driven member. When the clutch is embodied in a power take-off unit or is otherwise employed to control the transmission of power from an internal combustion engine, the rotary member 9 is preferably the flywheel of the engine, shown as being secured to a flange on the engine crank shaft by the bolts or screws 11. In such embodiment of the invention, the centrally disposed segmental clutch disc 12 constitutes the driving element of the clutch. The driven portion of the clutch comprises the front and rear clutch plates 13 and 14, which are adapted to be contracted together against the front and rear sides of the driving disc 12. The rear or outer clutch plate 14 is formed integral with a hub 15 which is keyed to the front end of the driven shaft 16. The keyed relation of the hub 15 on the shaft 16 is secured by a longitudinal key 17 and also by a wedge fit of the hub 15 over the tapered portion 18 of the shaft, such wedge fit being effected by a nut 19 which screws over a threaded forward portion of the shaft. The front extremity 21 of the shaft has pilot mounting in a pilot bearing 22 carried within a bore formed in the hub of the flywheel 9.

The front or inner clutch plate 13 of the driven pair 13, 14 is mounted for sliding movement toward and away from the outer clutch plate 14. A plurality of compression springs 24 which are seated in pockets in the opposing faces of the clutch plates at angularly spaced points around the clutch tend normally to shift the inner clutch plate 13 to an inward, clutch-releasing position. The clutch is engaged through the instrumentality of a plurality of pull pins 27 which are disposed at angularly spaced points around the clutch assembly. These pull pins slide in aligned guide apertures 28 and 29 formed in the clutch plates 13 and 14, respectively, and the inner end of each pull pin is formed with an enlarged head 31 which abuts against the inner end of a guide boss 32 projecting inwardly from the clutch plate 13. The opposite or outer end of each pull pin is slotted transversely, as indicated at 33, and extending across said slot is a pivot pin 34. Pivotally mounted in each slot 33 on the pin 34 is the apertured inner or forward end 36 of a toggle rocker 35. It will be understood that there is one of these toggle rockers 35 for each pull pin. The opposite or outer end of each toggle rocker has an apertured eye 37 for receiving a knuckle pin 38. Intermediate these apertured inner and outer ends, the toggle rocker is formed with an abutment shoulder or fulcrum 39 which is adapted to have rocker bearing engagement against an adjustable abutment ring 41. Said ring 41 has an internally threaded bore which screws over an adjusting thread 42 formed externally on a ring 43.

The ring 43 is held against rotation relatively to the driven clutch elements by an extension 44 of the key 17. A plurality of worm wheel teeth 45 are cut around the outer periphery of the abutment ring 41, and meshing with these teeth is a short adjusting worm 46 which is mounted on a short rotatable bearing shaft 47. The ends of the shaft 47 are mounted in two lugs 48 disposed relatively close together and projecting rearwardly from the driven clutch plate 14.

Formed in the periphery of the worm 46 are notches 51, into which snaps a detent spring 52 that is secured to the driven clutch plate 14 by the screw 53. The worm 46 is preferably secured to the shaft 47, and said shaft has a polygonal head 49 for receiving a wrench by which the worm 46 can be rotated. It will be evident that rotation of said worm will revolve the abutment ring 41 either forwardly or backwardly along the thread 42 of the inner ring 43, thereby adjusting the axial location of the inner surface of said ring 41, against which the fulcrum shoulders 39 of the toggle rockers bear. Convenient access to the above-described adjusting mechanism is made available through a hinged cover 55 which is hingedly mounted on the clutch housing 56.

The knuckle pin 38 at the rear end of each toggle rocker 35 establishes pivotal connection with the upper or inner end of a toggle link 58. The outer end of each toggle link has pivotal mounting on a pivot pin 59 carried by the shiftable clutch operating collar 61. The forward portion of this clutch collar is of generally tapering section, and formed at angularly spaced points in this tapered flange portion are radial slots 63 for receiving the toggle links 58. Pairs of radially projecting lugs or ears 64 extend outwardly on each side of each slot 63 for receiving the transverse pivot pins 59 on which the toggle links 58 are mounted. Shifting motion is imparted to the clutch collar 61 through a shifter fork 66 which is mounted on a transverse operating shaft 67, and which is formed with notched fork arms 68 that embrace shifter lugs 71 projecting laterally from a shifter ring 72. This ring is a diametrically split ring, which has its two halves bolted together over a radial flange 73 projecting from the shifter collar 61.

Figure 1 shows the position of the clutch operating mechanism when the clutch is engaged, and Figure 3 shows the position of the clutch operating mechanism when the clutch is released. In the operation of the mechanism, it will be evident that when the knuckle pivots 38 of the three or more toggle assemblies employed are oscillated in an inward direction toward the axis of the shaft 16, such motion of the toggle rockers 35 creates a rocker motion about the fulcrum pivots 39, which causes the pivots 34 to pull the pull pins 27 outwardly or rearwardly for engaging the clutch. Such inward oscillation of the knuckle pivots 38 is effected by the shifting motion of the shifter collar 61 in a direction toward the clutch assembly, as shown in Figure 1. To release the clutch, the shifter collar 61 is shifted outwardly in a direction away from the clutch assembly, as shown in Figure 3, with the result that the knuckle pivots 38 are permitted to oscillate outwardly in a direction away from the axis of the shaft 16. This takes the heavy rocking pressure off the fulcrum points 39, permitting the pull pins 27 to shift inwardly or forwardly under the energy of the release springs 27, in consequence of which the clutch assumes a released position. It will be noted that the knuckle pins 38 can be oscillated inwardly to a position which disposes them either in or slightly beyond a position of dead center alignment with the outer pivots 59 (Figure 1), in which dead center or over center relation the clutch will remain engaged without the necessity of having to maintain the engaging pressure on the manual control which operates the actuating shaft 67. When it is desired to adjust the clutch to compensate for wear of the clutch lining, or to advance or retard the time of engagement relatively to the motion of the control pedal or control handle, it is only necessary to open the spring cover 55 and to rotate the adjusting worm 46 for shifting the fulcrum ring 41 backwardly or forwardly.

Referring to Figure 3, it will be seen that when the clutch operating mechanism is in the clutch releasing position centrifugal force is capable of acting very effectively on the mass of each toggle rocker 35 and each toggle link 58. This centrifugal force tends to swing the toggle pivot or knuckle pin 38 of each toggle assembly in an outward direction, away from the shaft 16, thus tending to hold the clutch in its released position. This centrifugal force action aids in the operation of releasing the clutch, irrespective of whether the rotary wheel member 9 or the shaft 16 is the driving member. In those embodiments of the invention wherein the shaft 16 is the driving element, and the clutch operating parts rotate constantly even when the clutch is disengaged, this centrifugal force action can also be utilized to hold the clutch in its released position or to assist in holding it in such position. The degree of the centrifugal force action can be proportioned by varying the mass of the toggle rockers, toggle links, and knuckle pivots.

Figure 2:
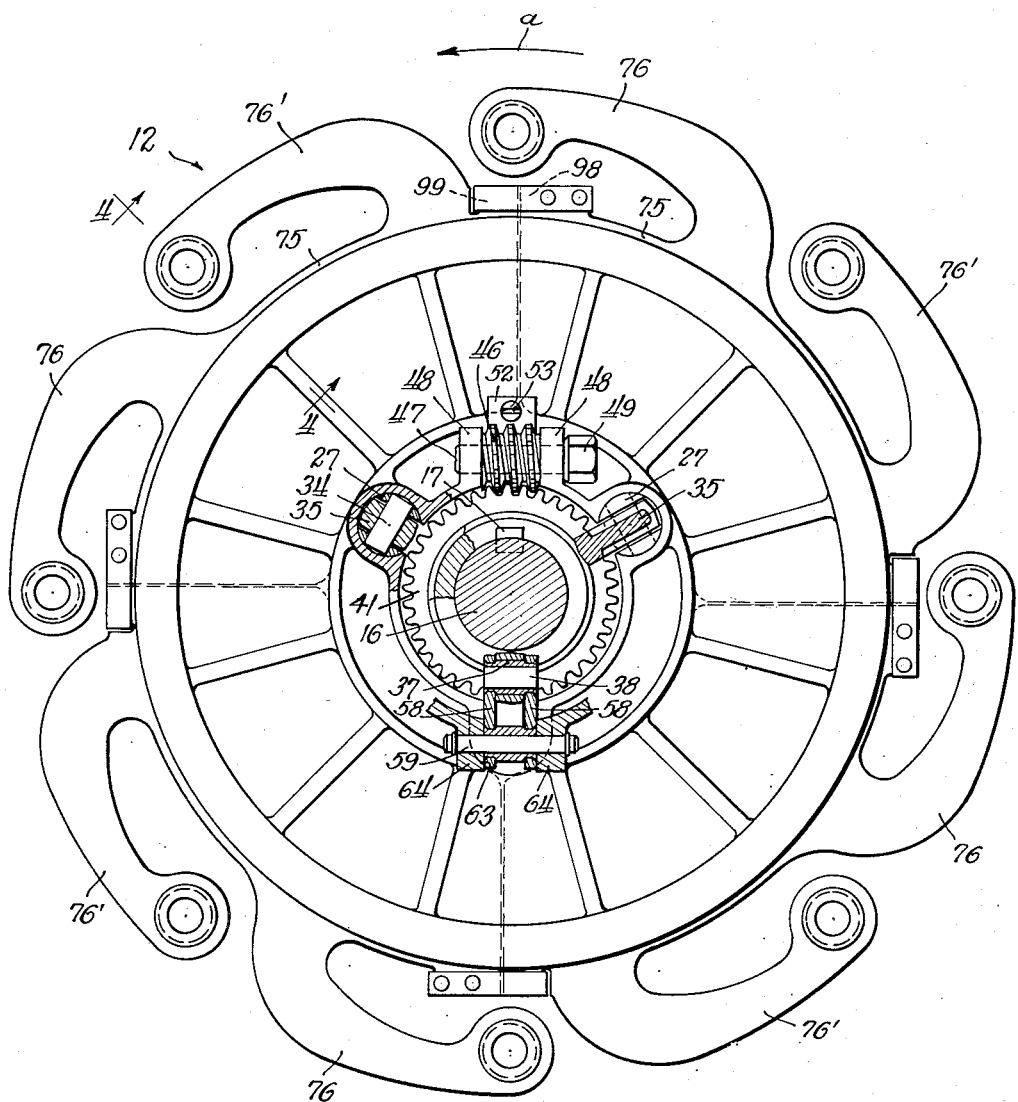
Figure 2 is a transverse sectional view taken approximately on the plane of the line 2—2 of Figure 1.

The improved construction of the segmental clutch disc 12 constitutes the principal subject matter of my prior Patent No. 2,303,201, of which the present application is a division. This segmental disc 12 is illustrated and described in considerable detail in that application, and hence need not be described here. The above described clutch operating mechanism can, of course, be used with various types of friction clutches having different forms of clutch discs. However, there are certain features pertaining to the adjustable mounting of the spring fingers of the segmental disc 12 that have cooperative relation to the adjustable relation of the clutch operating mechanism, and, accordingly, such adjustable mounting of the segmental disc 12 will now be described. It will be seen from Figure 2 that the disc 12 is made up of a plurality of segments 75, from which project the circumferentially extending flexible arms 76, 76'. The direction of rotation is represented as being counterclockwise (see arrow a in Figure 2), and when the disc 12 is the driving element, the arms or fingers 76, 76' extend forwardly in the direction of rotation, so that the driving torque always places these arms under tension. In the preferred construction illustrated, the disc is divided into four segments, and each segment is provided with two arms or fingers, consisting of a leading arm 76 and a trailing arm 76', although this specific number of segments and number of arms is not essential. Secured to the front and rear sides of each disc segment are the arcuate pieces of clutch lining material 77, the attachment being effected by rivets or screws 78 in conventional manner.

Each segment 75 and its integral mounting arms 76, 76' is preferably stamped out of sheet metal stock, such as a suitable steel of the appropriate composition, temper, and gauge as to enable the mounting arms to flex the required amount for engaging and releasing the clutch, and for accommodating misalignment. The preferred manner of punching the stampings, and the advantages of the particular shape of the spring fingers as illustrated are fully disclosed in my prior Patent No. 2,303,201, issued November 24, 1942, and also in my prior Patent No. 2,259,461, issued October 21, 1941. The outer end of each flexible mounting finger or arm is apertured to receive a bolting thimble or bushing 81. As shown in Figure 4, each bolting thimble or bushing is formed with a reduced inner end 81' which is passed through the aperture in the mounting finger and is then peened over to rivet the thimble to the finger.

The improved adjustable mounting means for mounting the apertured outer end of each of these flexible mounting fingers comprises a cap screw 83 and a threaded sleeve 84, as clearly shown in Figure 4. One of these assemblies is provided for the outer end of each finger, 76, 76'. The threaded shank portion of the sleeve 84 screws into a tapped bore 85 formed in the flywheel 9. The cap screw 83 passes through the thimble 81 and through the sleeve 84 and taps into a threaded bore 86 of smaller diameter, extending coextensively from the inner end of the threaded bore 85. The sleeve 84 is formed with an enlarged head portion 84' which serves as an adjustable mounting stop for determining the position of the apertured end of each mounting finger 76, 76'. The periphery of the enlarged head 84' is of hexagonal formation to receive a wrench by which the sleeve 84 can be screwed inwardly or outwardly in the bore 85 to adjust the fore and aft position of the abutment head 84'. The stop sleeve 84 is rigidly held in any position to which it has been adjusted upon the tightening of the cap screw 83, which exerts a binding force on the sleeve 84 for locking the latter in its adjusted position. Figure 4 illustrates two positions of the disc segment 75, the rear full-line position r representing the released position of the clutch disc, and the front dotted-line position e representing the engaged position of the clutch disc. By adjusting the mounting sleeves 84 inwardly or outwardly, these positions r and e can be displaced forwardly or rearwardly with respect to the driven clutch discs 13 and 14, thereby adjusting for wear of the clutch linings 77, or adjusting for throw of the clutch control member. In the preferred construction illustrated, the released position r of each segment 75 coincides with the transverse plane of the anchored outer ends of the fingers 76, 76', although, if desired, these fingers might be given a set so that the released position r of the segment would be displaced forwardly from the transverse plane of the ends of the fingers as far as the engaged position e would be displaced rearwardly from said plane. In the assembly of the clutch, all eight stop sleeves 84 are adjusted to dispose their stop surfaces in the same transverse plane. This is easily accomplished by extending a gauge bar diametrically across the rear edge 88 of the flywheel housing 89 (Figure 1), this gauge bar having a calibrated stop against which the sleeves 84 are adjusted as the gauge bar is revolved around the edge of the flywheel housing. An arcuate opening 91 is formed in the upper part of the flywheel housing 89, this opening being normally closed by any suitable cover 92. Access can readily be gained to the cap screws 83 and stop sleeves 84 through this opening 91 whenever it is desired to adjust the clutch for wear of the clutch linings.

While I have illustrated and described what I regard to be the preferred embodiment of my invention, nevertheless it will be understood that such is merely exemplary, and that numerous modifications and rearrangements may be made therein without departing from the essence of the invention.

I claim:

1. In a clutch of the class described, the combination of a pair of cooperating clutch elements, one of which is shiftable, pull pins connected to shift said shiftable clutch element, rocker members pivotally connected at their forward ends to said pull pins, toggle links pivotally connected to the other ends of said rocker members, a shiftable clutch operator operative to oscillate said toggle links, fulcrum projections on said rocker members intermediate the ends thereof, an internally threaded abutment ring against which said fulcrum projections react, and an externally threaded mounting ring over which said abutment ring threads, and along which it is adjustable, said mounting ring transmitting reaction pressure to the other of said clutch elements.

2. In a clutch of the class described, the combination of a first clutch element, a second clutch element comprising two relatively shiftable clutch members adapted to effect clutching engagement with said first clutch element, toggle levers having pivotal mounting on one of said relatively shiftable clutch members for swinging movement in planes extending substantially radially of the clutch, a mounting ring associated with the other of said relatively shiftable clutch members, an abutment ring screwing externally over said mounting ring for axial adjustment, fulcrum portions on said levers adapted to exert reaction pressure against said abutment ring at respective points spaced radially inwardly from the pivotal center of said toggle levers, a control sleeve shiftable axially of the clutch, toggle links having their outer ends pivotally connected with said control sleeve, and knuckle pivots connecting the inner ends of said toggle links with said toggle levers, said knuckle pivots being movable substantially into dead-center relation in approximately the same transverse plane as the outer pivots of said links in the operation of engaging the clutch.

3. In a clutch of the class described, the combination of a first clutch element, a second clutch element comprising two relatively shiftable clutch members adapted to effect clutching engagement with said first clutch element, pull pins connected with one of said relatively shiftable clutch members, rocker levers having pivotal mounting on said pull pins, an externally threaded mounting ring bearing against the other of said relatively shiftable clutch members, an internally threaded abutment ring adapted to be screwed inwardly or outwardly along said externally threaded mounting ring, fulcrum portions on said levers arranged for fulcrum engagement against said abutment ring at points respectively spaced radially inwardly from said pull pins, a shifter sleeve shiftable axially of the clutch, toggle links, outer pivots connecting the outer ends of said toggle links with said shifter sleeve, and knuckle pivots connecting the inner ends of said toggle links with said levers, said knuckle pivots being movable into substantially the same transverse plane as said outer pivots in the operation of engaging the clutch.

4. In a clutch of the class described, the combination of a first clutch element, a second clutch element comprising inner and outer relatively shiftable clutch members adapted to effect clutching engagement with said first clutch element, pull pins secured to said inner shiftable clutch member, a plurality of rocker members pivotally mounted on said pull pins for swinging movement in planes extending substantially radially of the clutch, fulcrum portions on said levers arranged to have fulcrum engagement against said outer shiftable clutch member at points spaced respectively radially inwardly of said pull pins, a control sleeve shiftable axially of the clutch and rotating with said second clutch element, toggle links associated with each rocker, outer pivots pivotally connecting the outer ends of said toggle links with said control sleeve, and knuckle pivots pivotally connecting the inner ends of said toggle links with their respective rockers, said rockers, links, and knuckle pivots being arranged whereby said knuckle pivots are movable substantially into dead center relation in the operation of engaging the clutch, and wherein centrifugal force acting on said rockers, links and knuckle pivots tends to move said parts to clutch releasing position in the operation of disengaging the clutch.

5. In a clutch, the combination of a first clutch element, a second clutch element comprising inner and outer relatively shiftable clutch members adapted to effect clutching engagement with said first clutch element, a rocker having pivotal connection with said inner clutch member, a control sleeve shiftable axially of the clutch, a motion transmitting link having one end pivotally connected with said rocker and having its other end pivotally connected with said control sleeve, said rocker comprising a fulcrum portion, a threaded member associated with said outer clutch member, an abutment ring having threaded engagement with said threaded member and against which said fulcrum portion is adapted to have fulcrum engagement, and cooperating worm and worm wheel means operative to screw said abutment ring inwardly or outwardly along said threaded member for enabling said fulcrum point to be shifted axially with respect to said outer relatively shiftable clutch member.

6. In a clutch of the class described, the combination of a first clutch element, a second clutch element comprising inner and outer relatively shiftable clutch members adapted to effect clutching engagement with said first clutch element, pull pins connected with said inner clutch member and extending outwardly through said outer clutch member, rocker levers having pivotal mounting on said pull pins for swinging movement in planes extending substantially radially of the clutch, a controllable shifter sleeve shiftable axially of the clutch, toggle links having their outer ends pivotally connected with said shifter sleeve and having their inner ends pivotally connected with said rocker levers, fulcrum portions formed on said rocker levers inwardly of said pull pins, an abutment ring against which said fulcrum portions are adapted to have fulcrum engagement, a threaded member associated with said second clutch element and over which said abutment ring is adapted to thread axially of the clutch, worm wheel teeth formed around said abutment ring, and an adjusting worm carried by said second clutch element and engaging with said worm wheel teeth for rotating said abutment ring to screw the latter axially inwardly or outwardly along said threaded member.

CLARENCE M. EASON.